United States Patent Office 2,693,882
Patented Nov. 9, 1954

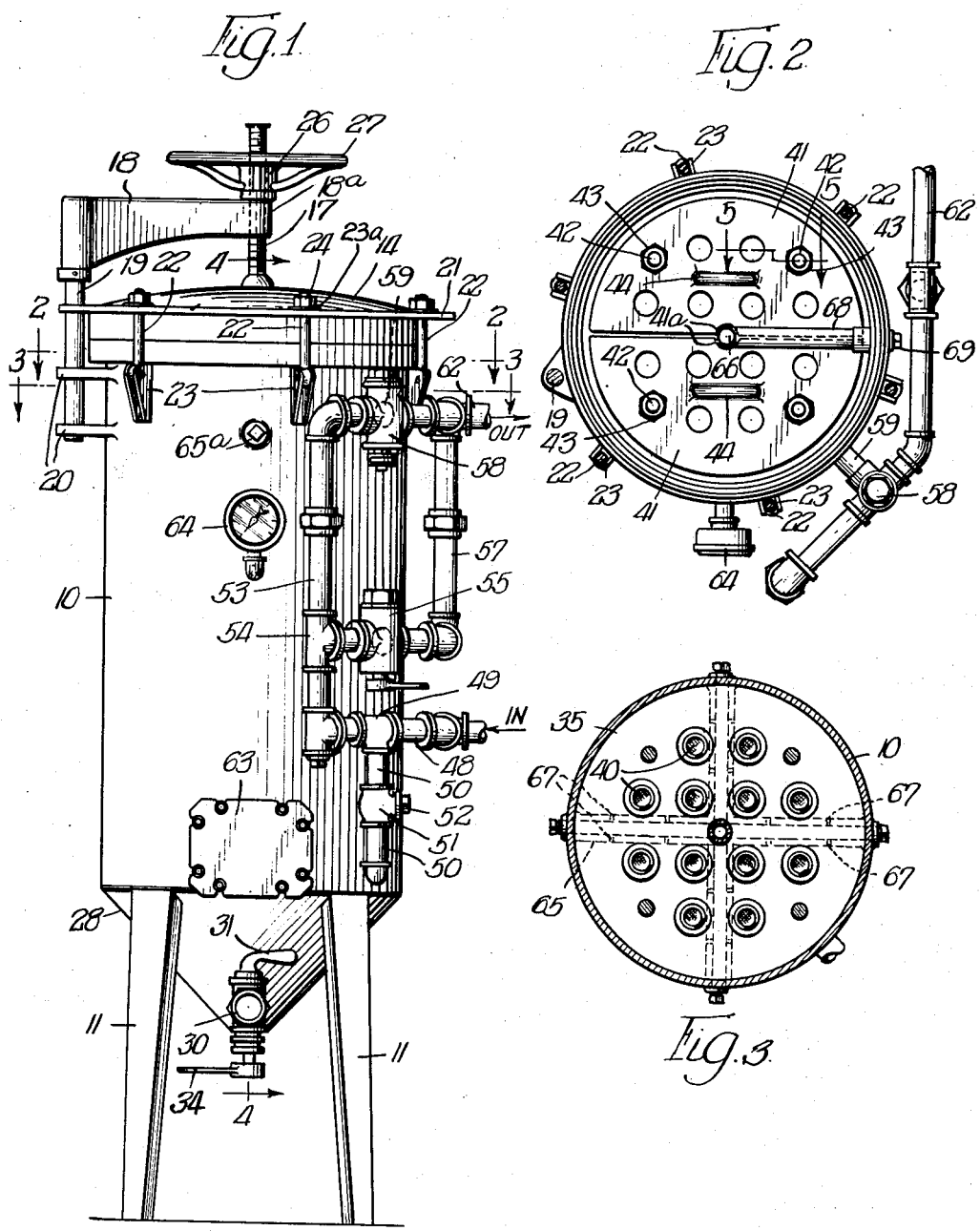

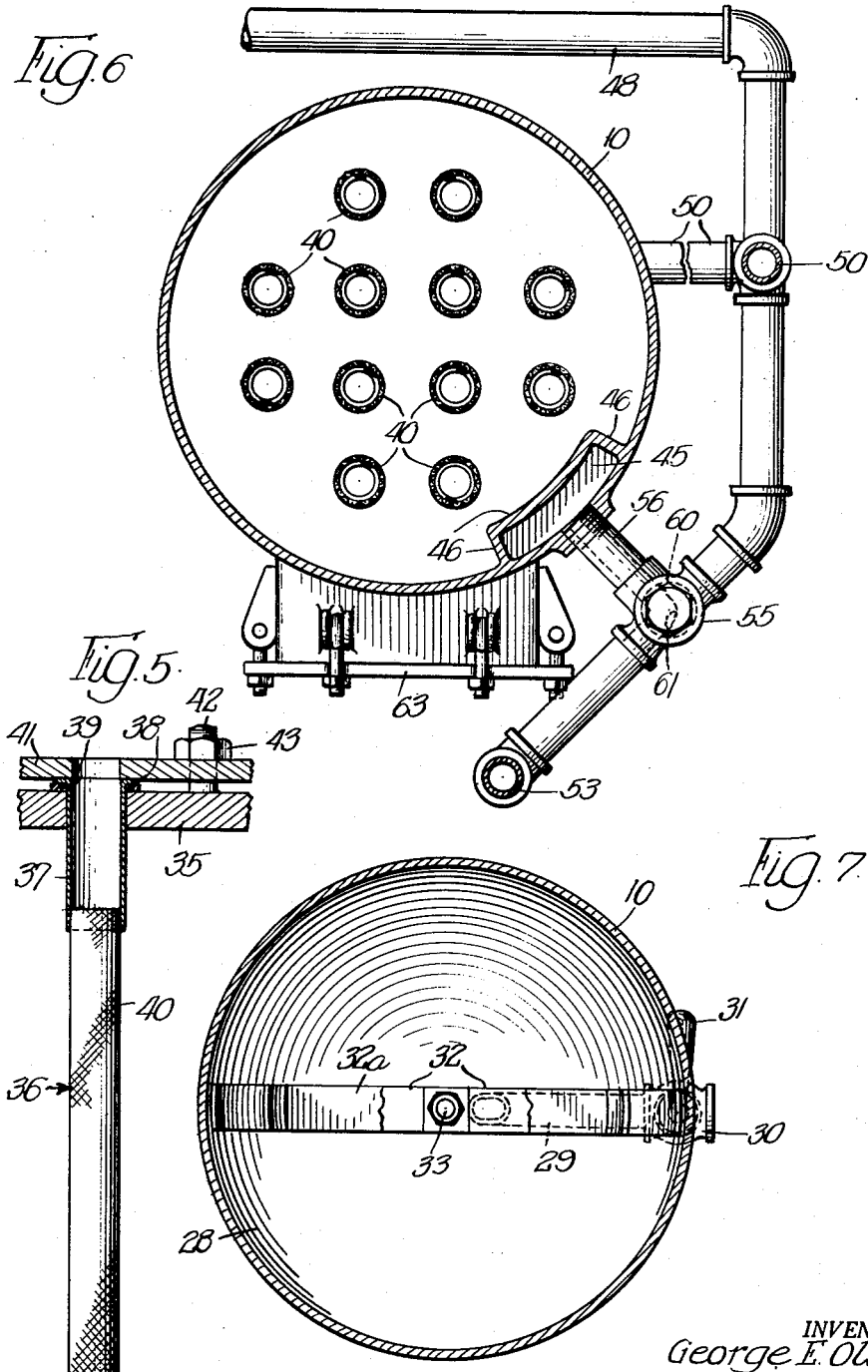

2,693,882

BACKWASH FILTER

George E. Olson and Dwight L. Ebert, Chicago, Ill., assignors to Olson Filtration Engineers, Inc., Chicago, Ill., a corporation of Illinois Application January 3, 1951, Serial No. 204,220

2 Claims. (Cl. 210—184)

The present invention relates to improvements in upflow filters.

In prior filters of the upflow type, it has been common practice to pump the material to be filtered into the bottom region of the filter. This has tended to keep in suspension the dirt which has accumulated in that region, tending to redeposit such dirt upon the filtering media.

An object of the present invention is to provide a filter of the upflow type in which the tendency to keep the dirt in suspension is materially reduced.

A further object is to provide a filter of the upflow type in which the filtering media are readily removable and replaceable whereby the matter of inspection and repairs is greatly simplified.

A further object is to provide a filter of the upflow type in which the depositing of clean filter aid or relatively clean filter cake which has dropped to the bottom of the filter upon the filtering media may be readily accomplished.

A further object is to provide a filter having pendant tubular filtering media provided with a simple but sturdy holding means for such filter media so arranged that said filtering media may be readily removed and replaced.

A further object is to provide a filter of the upflow type having pendant filtering media and improved means for scraping the lower portion of said filter to facilitate the removal of dirt.

A further object is to provide a filter of the upflow type which is simple, sturdy and well adapted to meet the needs of commercial operation.

Referring to the drawings—

Figure 1 is a view in side elevation of one embodiment of the present invention;

Figure 2 is a sectional view taken along the plane indicated by the arrows 2—2 of Figure 1;

Figure 3 is a sectional view taken along the plane indicated by the arrows 3—3 of Figure 1;

Figure 5 is a sectional view taken along the planes indicated by the arrows 5—5 of Figure 2 indicating in detail the construction involving the filtering media and the holding means therefor;

Figure 6 is a sectional view taken along the plane indicated by the arrows 6—6 of Figure 4; and Figure 7 is a sectional view taken along the plane indicated by the arrows 7—7 of Figure 4.

Figure 4:
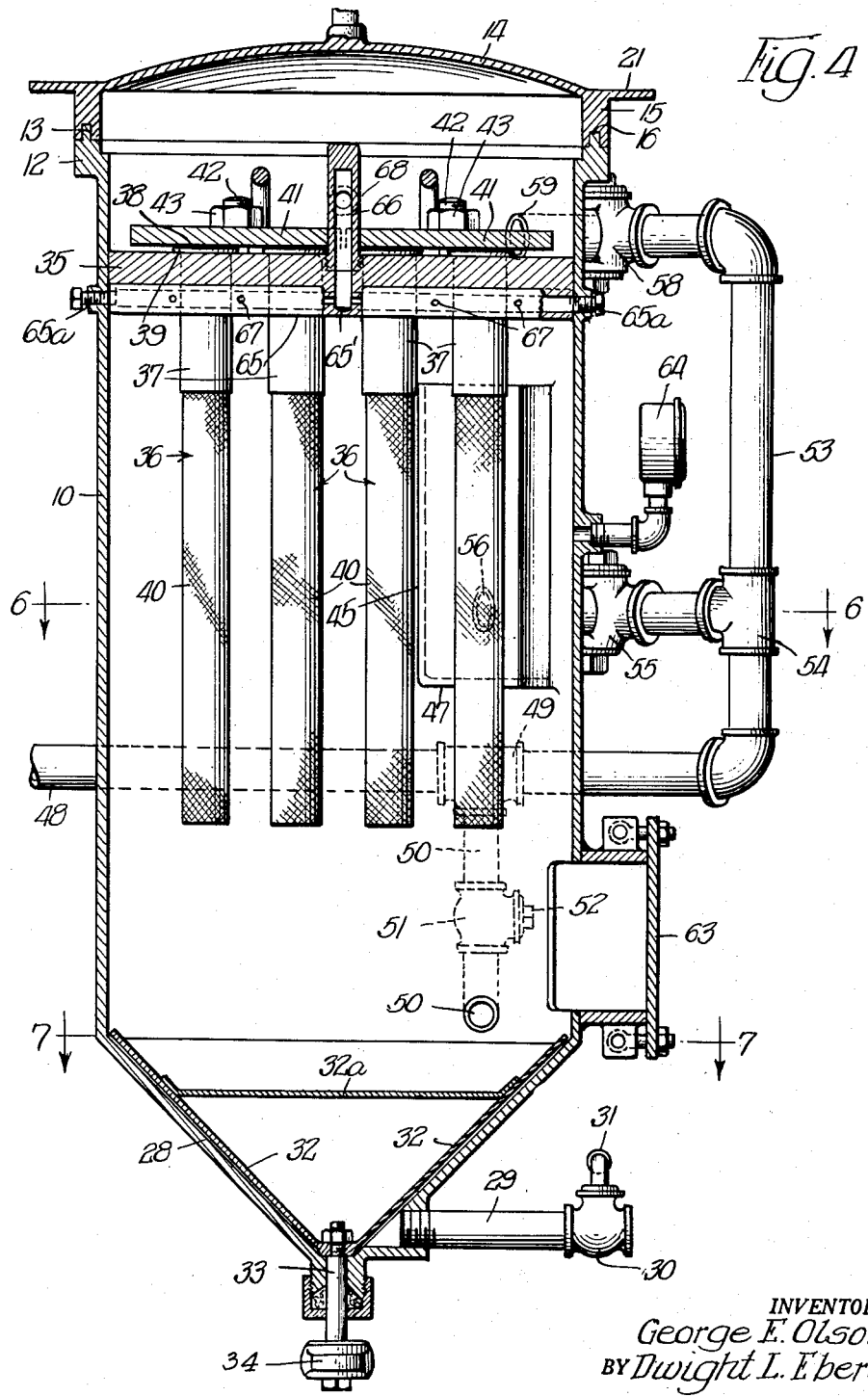
Figure 4 is a vertical sectional view taken along the plane indicated by the arrows 4—4 of Figure 1.

The numeral 10 indicates a tubular casing which may be supported by the legs 11—11. Said tubular casing 10 at its upper region is provided with the annular shoulder 12 having an annular upstanding tongue 13. Disposed in cooperative relationship with the top of the casing 10 is the removable cover plate 14 provided with an annular wall 15 having a groove 16 for receiving the annular tongue 13.

As indicated in Figure 1, the cover plate 14 is provided with the upstanding threaded stem 17 loosely received within an aperture in the extremity 18a of the swinging arm 18, which swinging arm 18 is fast upon the shaft 19 which is supported and journaled in the brackets 20—20 secured to the exterior of the casing 10. The cover 14 is provided with the outstanding flange 21 which has a groove in its periphery to loosely receive the shaft 19, which therefore provides an axis for swing of the cover 14 in a horizontal plane.

The numerals 22—22 indicate holding bolts swingingly supported by brackets 23—23 secured to the exterior of the casing 10. Said holding bolts 22—22 are adapted to enter corresponding notches in the annular flange 21 and are provided with washers 23a—23a and nuts 24—24.

Located upon the threaded shaft 17 above the portion 18a of the swinging arm 18 is the nut 26 having threaded engagement with said shaft, which nut is provided with the hand wheel 27. By turning the hand wheel 27, the threaded shaft 17 may be raised or lowered, thereby communicating an opening or closing movement to the cover 14. Since the arm 18 is swingable about the axis of the shaft 19, it is a simple matter to open the cover 14 and to swing it out of alignment with the casing 10 or to return said cover into engagement with said casing 10 and clamp said cover in closing relationship with said casing.

Said casing 10 is provided at its lower end with the conical bottom 28, said conical bottom 28 being provided adjacent to its lowermost extremity with the outlet pipe 29. Said outlet pipe 29 is provided with the shut-off valve 30 having an operating handle 31. The numerals 32—32 indicate scrapers resting upon the conical inner wall of the bottom 28. Said scrapers 32—32 are provided with the cross-brace 32a and are fast with the shaft 33, which extends downwardly through the lower extremity of the conical bottom 28. Said shaft 33 is provided with an operating handle 34, by means of which an agitating movement of rotation or oscillation may be communicated to the scrapers 32—32 to remove sediment from the conical inner wall of the bottom 28.

The casing 10 is provided at a region adjacent to its upper extremity with the diaphragm 35, which may be welded or otherwise united to the inner wall of said casing 10. Said diaphragm 35 is provided with a plurality of spaced apertures, each adapted to receive a pendant filter member, said filter member being represented in its entirety by the numeral 36.

As illustrated in Figure 5, each of the filter members includes a protective tube 37 having a flange 38, which is adapted to rest upon a gasket 39 which in turn rests upon the top side of the diaphragm 35. Disposed within each protective tube 37 is a filter tube 40 (which may be of foraminous material). Each of said tubes 40 at its upper extremity is disposed within and welded to a corresponding tube 37 whereby each of said protective tubes 37 and its corresponding filter tube 40 comprises a flanged filter member. The filter tubes 40 extend well down into the casing 10, but the protective tubes 37 extend down only a short distance.

Disposed above the flanges 38—38 of the filter members 36 are two approximately semi-circular hold-down plates, indicated in Figure 2 by the numerals 41—41, the diametrical sides of said plates having semi-circular recesses 41a—41a to accommodate a vertically disposed air venting tube or pipe to be referred to presently.

Each of said hold-down plates 41—41 is provided with holes extending therethrough adapted to take over upstanding threaded studs 42—42 secured to the diaphragm 35, said hold-down plates being held in position by means of nuts 43—43. Each of said hold-down plates 41 is provided with a handle 44 whereby said hold-down plates may be lifted when it is desired to get at the filter members 36—36.

The interior of the casing 10 is provided with a baffle chamber 45 provided by the vertical walls 46—46 and the bottom wall 47. Said vertical walls extend upwardly to a plane just above the lower ends of the protective tubes 37—37 of the various filter members 36.

The numeral 48 indicates an inlet pipe for material to be filtered, which pipe is provided intermediate of its length with a T-coupling 49, one port of which leads to the downwardly extending pipe 50 which communicates with the interior of the casing 10 at a region adjacent to the bottom of said casing just above the top portion of the conical bottom 28. Said pipe 50 is provided with the on-and-off valve 51, which may be controlled by means of the hexagonal nut 52. Said coupling 49 also connects with the upwardly extending pipe 53 which, intermediate of its length, is provided with a T-coupling 54, which, through a side port, provides communication to the three-way valve 55. One port of said three-way valve 55 communicates, through a pipe 56, with the interior of the baffle chamber 45, near the bottom thereof. Another port of said three-way valve 55 communicates with the vertically extending pipe 57 (Figure 1). The upper extremities of the vertically extending pipes 53 and 57 have communication with opposite ports of the three-way valve 58, the mid-port of which communicates, through the pipe 59, with the chamber above the diaphragm 35 in the casing 10.

The three-way valves 55 and 58 are similar in design and the structure thereof is sufficiently illustrated in Figure 6, which shows that a rotor 60 of the valve 55 is provided with a U-shaped channel 61 whereby when the rotor of said valve 55 is turned in one direction communication is had from the inlet pipe 48 and pipe 53 through said three-way valve 55 to the baffle chamber 45 in the casing 10. When the rotor of the three-way valve 58 is turned to one of its two alternative positions communication is had from the chamber above the diaphragm 35 in the casing 10 through the pipe 59 and said three-way valve to the outlet pipe 62. These are the "run" positions of the three-way valves 55 and 58. For backwashing, the rotor of the three-way valve 58 will be turned to its alternative position, 90 degrees from the position just referred to, and communication will be had from the inlet pipe 48 and pipe 53 through the three-way valve 58 and pipe 59 to the chamber above the diaphragm 35 in the casing 10. Liquid will pass down and out through the filter tubes 40—40 into the chamber below the diaphragm 35, thence into the baffle chamber 45. At this time the rotor of the three-way valve 55 will be turned to its alternative position (90 degrees from that immediately above mentioned) and communication will be had from the baffle chamber 45 through the pipe 56 to the three-way valve 55 to pipe 57, thence to the outlet pipe 62.

Expressed in other language, during filtering operations the material to be filtered will be admitted through the pipe 48, whence it will pass through the coupling 54 to the valve 55, then into the baffle chamber 45, up over the top walls 45 of said baffle chamber, into proximity with the protective tubes 37 through the walls of the filter tubes 40 to the chamber above the diaphragm 35. The filtered material will then pass through the mid-port of the three-way valve 58 to the pipe 62.

When back-washing is to be performed, the rotors of each of the valves 55 and 58 will be given quarter turns so that liquid entering through the pipe 48 will pass upwardly through the pipe 53 through the three-way valve 58 into the chamber above the diaphragm 35 down through the filter tubes 40, out through the pipe 56 and three-way valve 55 through the pipe 57 to the outlet pipe 62.

The casing 10 adjacent to the bottom thereof is provided with the removable plate 63 whereby access may be had to the bottom of the filter. Said casing 10 is also provided intermediate of its height with the pressure gauge 64. Located in the casing 10 just below the diaphragm 35 are a plurality of air venting tubes 65—65, which communicate with and radiate from the interior of the central boss 65', which communicates with the upstanding tube 66 located at the axis of the casing 10. Said tubes 65—65 are provided with inlet apertures 67—67. The tube 66 may be threaded into the diaphragm 35 and communicates with the radial tube 68 which leads from the interior of the tube 66 to the exterior of the casing 10, communication with the atmosphere being controlled by any preferred type of valve 69. The tubes 65—65 may extend to the exterior of the casing 10 and may be stopped by the removable plugs 65a, which may be removed for the purpose of cleaning said tubes 65—65.

In operation, it is a simple matter to raise the cover 14 and to swing said cover away from the top of the casing 10. The nuts 43—43 may then be removed, after which the semi-circular hold-down plates 41 may be lifted by means of the handles 44—44.

The filter members 36 may then be lifted out of the diaphragm 35, may be inspected, repaired and replaced. The hold-down plates 41—41 will then be restored to their normal positions, the nuts 43 turned down, and the cover 14 swung into place and clamped down upon the top of the casing 10 by manipulation of the hand wheel 27. The hold-down bolts 22—22 will aid in holding the cover 14 securely in position.

The rotor of the valve 55 and the rotor of the valve 58 will be turned to positions providing access from the inlet pipe 48 through the coupling 54 to the three-way valve 55 into the baffle chamber 45. At this time the rotor of the valve 58 will be positioned to provide communication between the chamber above the diaphragm 35 and the outlet pipe 62 and stop communication with the pipe 53. Consequently liquid will pass into the baffle chamber 45, upwardly over the top of the walls thereof, against the protective tubes 37—37, down around the exterior surfaces of the filter tubes 40—40, up through said tubes to the chamber above the diaphragm 35, thence out through the valve 58 to the outlet pipe 62. After the usual precoating operation, the filtering operation may be started.

At certain times the clean filter aid or reasonably clean filter cake may become deposited in the bottom of the filter. This frequently happens if the pump is stopped before the filter cake has become impregnated with dirt. In order to salvage this relatively clean filter aid or filter cake, the shut-off valve 51 may be turned to permit access from the pipe 48 to the bottom of the casing 10, stirring up the filter aid or filter cake referred to, whereby it will be deposited or redeposited on the filter tubes 40—40. If preferred, the rotor of the valve 55 may be turned to stop communication between the valve 55 and the coupling 54 so that the entire force of the incoming liquid will be utilized in stirring up the filter aid or filter cake sought to be recovered.

When it is desired to back-wash the filter, the rotor of the valve 58 will be positioned to provide communication between the pipe 53 to the chamber above the diaphragm 35 and the rotor of the valve 55 will be positioned to permit access from the baffle chamber 43 to the outlet pipe 62. Under these conditions liquid will pass from the inlet pipe 48 through the three-way valve 58 into the chamber above the diaphragm 35 down through the tubes 40, removing the filter cake from said tubes, most of which will drop down into the conical bottom 28 of the filter. Liquid will pass through the pipe 56 and valve 55 to the pipe 57, then out through the outlet pipe 62.

Sediment may be removed from the conical bottom 28 through the shut-off valve 30 of said bottom by means of the scrapers 32, which may be oscillated or rotated by means of the handle 34. It will be noted that according to the construction illustrated, no gears are required within the filter casing and the manipulating means for the scrapers is located outside of the filter.

A practical advantage of the present invention is that the material to be filtered is baffled upon entry into the filter casing and the filter cake on the tubes 40—40 is protected by means of the tube 37—37 against the force of the incoming material to be filtered. Moreover, by reason of the present invention, there is very little tendency to stir up any dirt which has accumulated in the bottom of the filter.

The baffle chamber 45 has the advantage of directing the flow up to the underneath side of the diaphragm 35 to protect the operating portions of the filter tubes 40—40 and to equalize the flow over said operating portions of said filter tubes.

It will be noted further that the discharge pipe from the chamber above the manifold 45 is independent of the cover, so that the cover may be opened and the filter members 36—36 may be removed, inspected and replaced without disturbing any pipes.

Though a preferred embodiment of the present invention has been described in detail, many modifications will occur to those skilled in the art. It is intended to cover all such modifications that fall within the scope of the appended claims.

We claim:

1. In a filter, in combination, a casing having a diaphragm therein dividing said casing into an upper chamber and a lower chamber, the diaphragm having openings therein and filter means supported in said openings, the upper portions of the filtering means in the lower chamber adjacent the diaphragm being imperforate, means for admitting liquid to said lower chamber, air venting tubes supported from the diaphragm extending crosswise of the casing in the lower chamber adjacent the lower face of the diaphragm, said tubes having a plurality of spaced inlet apertures therein, an imperforate tube connected to said vent tubes and extending exteriorly of the casing and a valve for controlling discharge of air from said tube.

2. In a filter, in combination, a casing having a diaphragm therein dividing said casing into an upper chamber and a lower chamber, the diaphragm having openings therein and filter means supported in said openings, the upper portions of the filtering means in the lower chamber adjacent the diaphragm being imperforate, means for admitting liquid to said lower chamber, air venting tubes extending crosswise of the casing in the lower chamber adjacent the lower face of the diaphragm, said tubes having a plurality of spaced inlet apertures therein, said tubes having ends terminating in the side walls of the casing, closures for said tube ends removable from the outside of the casing, an imperforate tube connected to said vent tubes and extending exteriorly of the casing, a valve for controlling discharge of air from said tube, and a baffle in the lower chamber adjacent the means for admitting liquid to said chamber, said baffle serving to direct incoming liquid upwardly toward the air venting tubes.

References Cited in the file of this patent

UNITED STATES PATENTS

| Number | Name | Date |
|---|---|---|
| 515,700 | Wilkinson | Feb. 27, 1894 |
| 828,320 | Kiefer | Aug. 14, 1906 |
| 1,666,515 | Sweetland | Apr. 17, 1928 |
| 2,301,430 | Malanowski | Nov. 10, 1942 |
| 2,374,976 | Briggs et al. | May 1, 1945 |
| 2,423,172 | Booth | July 1, 1947 |
| 2,468,603 | Pew | Apr. 26, 1949 |
| 2,496,370 | Baily | Feb. 7, 1950 |
| 2,562,730 | Miller | July 31, 1951 |
| 2,600,458 | Ackley et al. | June 17, 1952 |
| 2,605,903 | Schuller | Aug. 5, 1952 |

FOREIGN PATENTS

| Number | Country | Date |
|---|---|---|
| 358,998 | France | Jan. 8, 1906 |
| 700,224 | France | Dec. 12, 1930 |